Patented Sept. 12, 1939

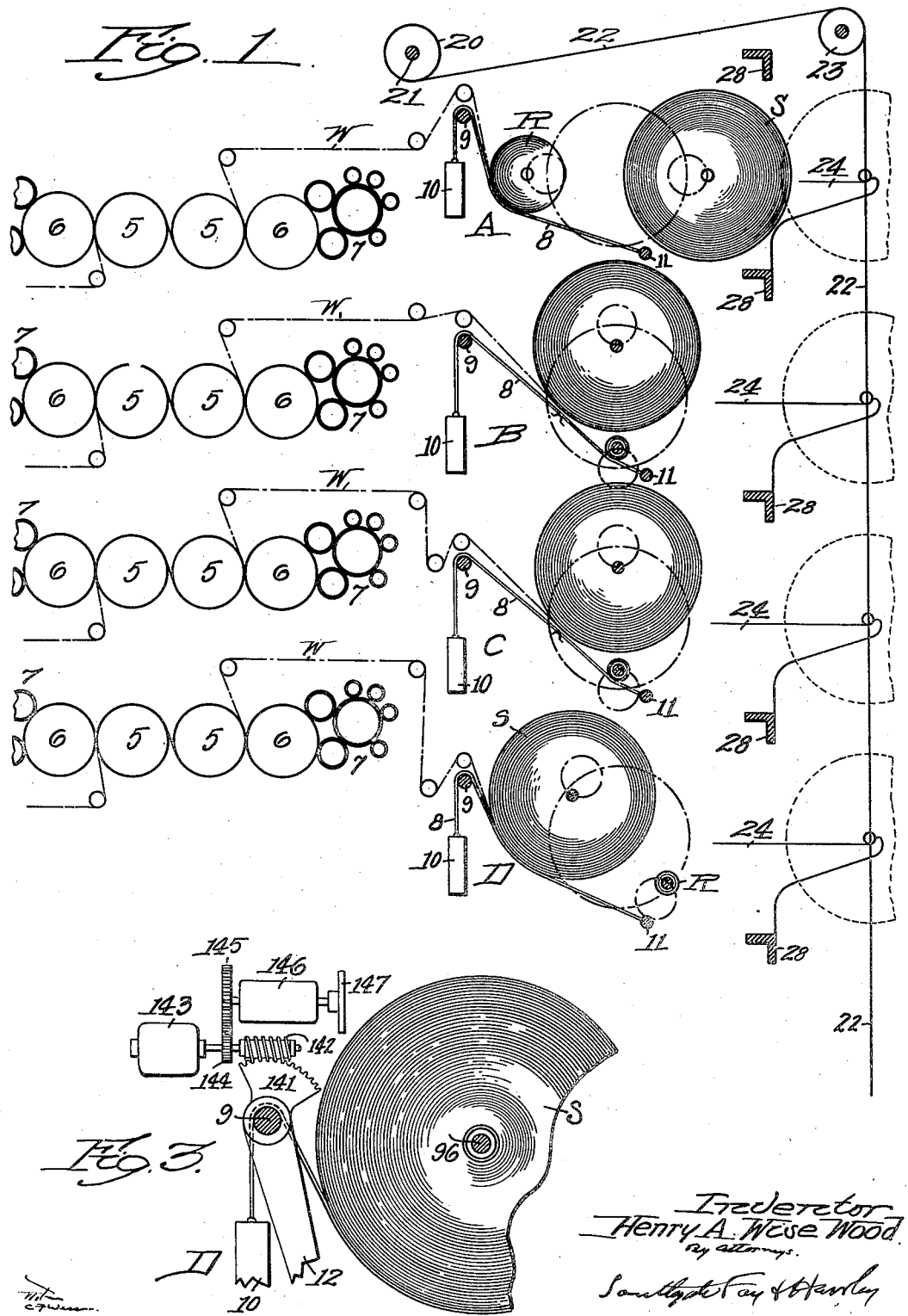

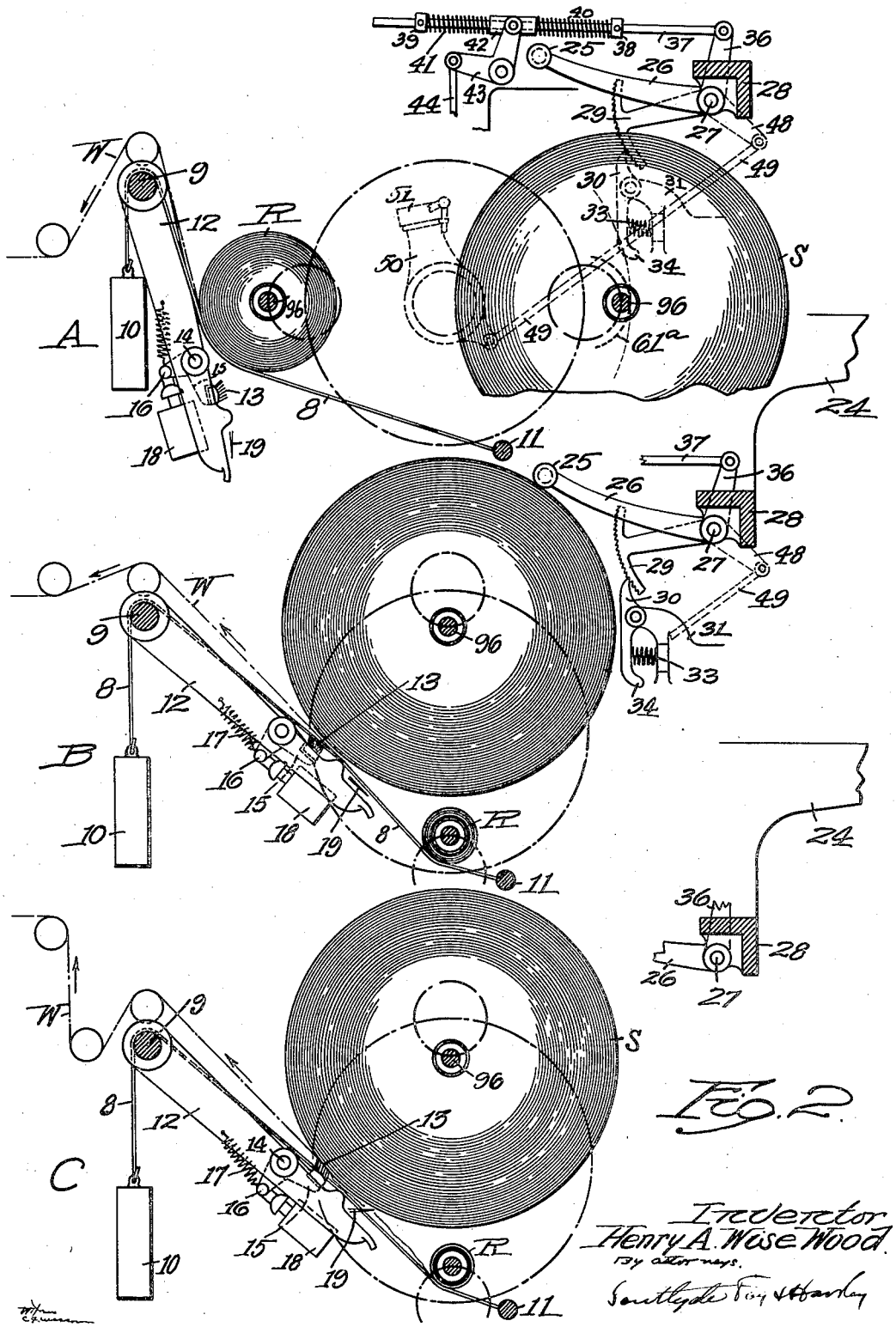

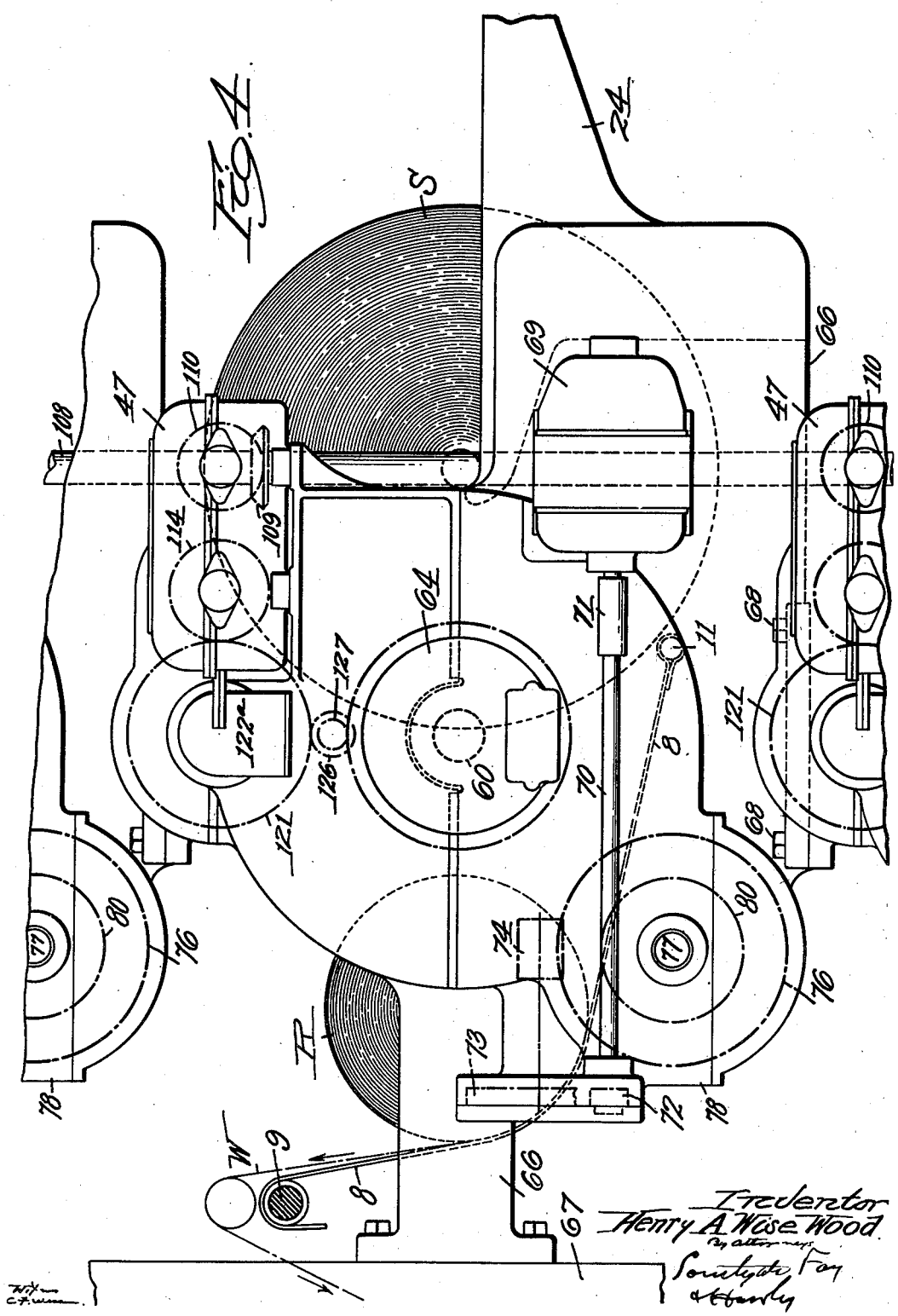

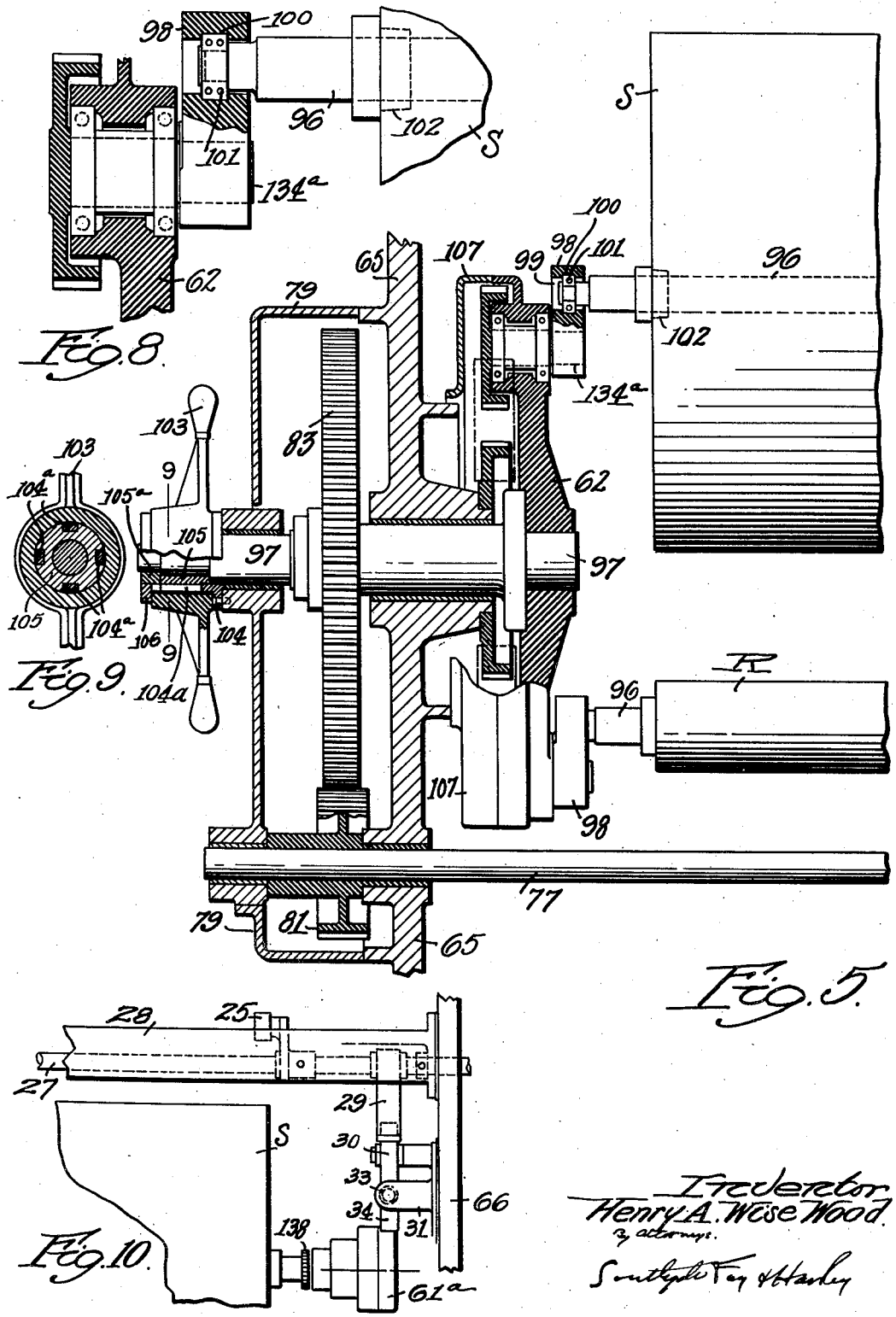

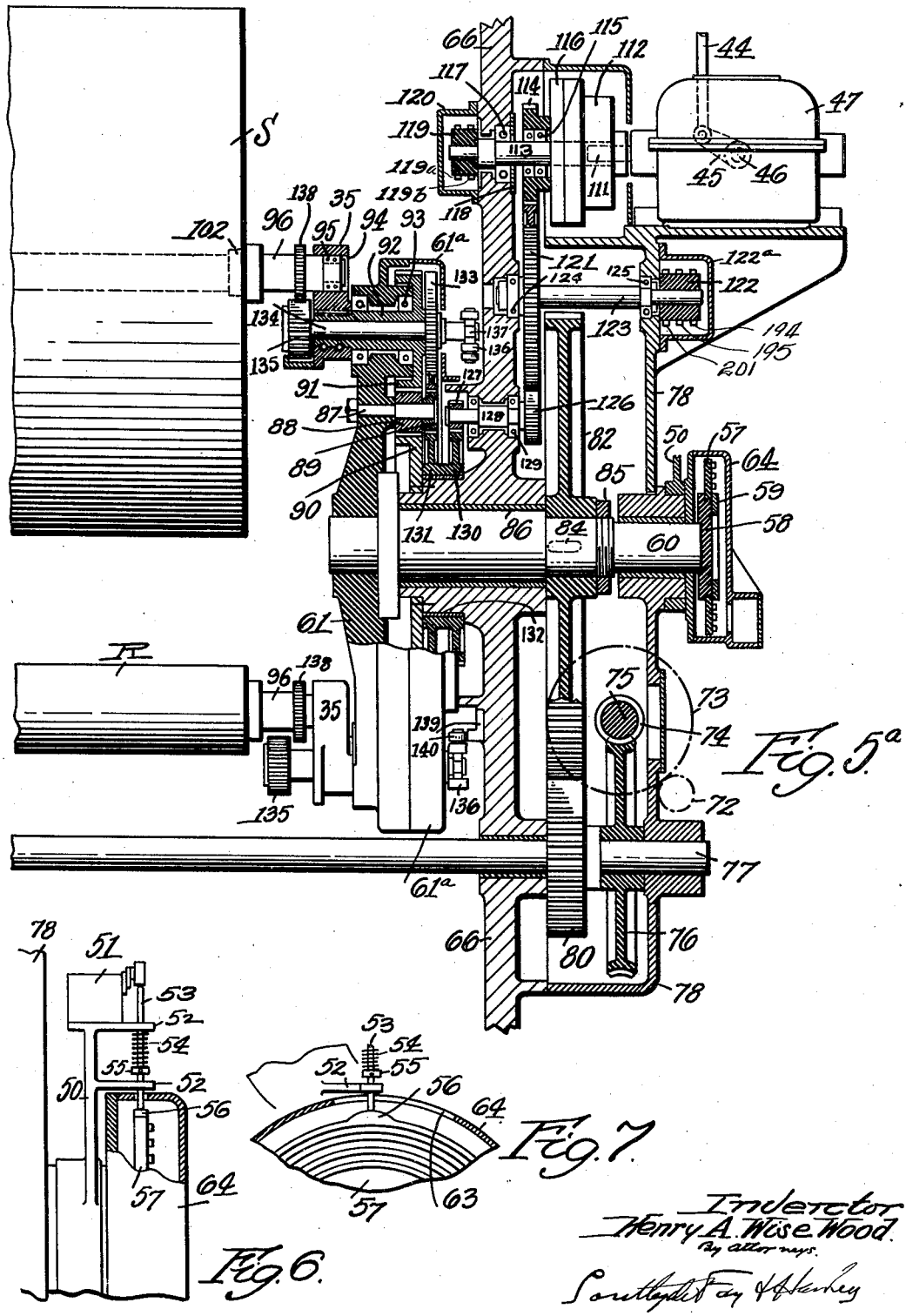

2,172,722

UNITED STATES PATENT OFFICE 2,172,722

WEB SPLICING DEVICE

Henry A. Wise Wood, New York, N. Y., assignor to Wood Newspaper Machinery Corporation, New York, N. Y., a corporation of Virginia Application March 22, 1935, Serial No. 12,365

5 Claims. (Cl. 242—58)

This invention relates to a full speed web splicing device. It applies particularly to the deck type of press, in which case one deck is placed above another and the feed of paper is supplied on the floor level on which the press is mounted. In constructions of this kind it is very often necessary to mount one paper supply above another.

The principal objects of this invention are to provide means whereby, in this type of press, the rolls which carry a central spindle will not have to be stopped in order to make the splice but on the contrary the web will run at full speed during the splicing operation; to provide a construction in which the spare roll coming to the point for splicing will move in an elliptical path with its major axis horizontal; to provide means whereby the roll, while traversing that path, will lift a movable member to measure the diameter of the spare roll and when the roll reaches its maximum height, the said lifted member will be retained at its highest position; to provide means whereby the operation of said member will regulate a variable speed mechanism to give the proper surface speed to the spare roll at the time of splicing and also regulate a stop switch to stop the movement of the roll support or reel automatically and compensate for variations in diameter of the spare roll, thus providing a predetermined distance between the spare roll and the splicing brush at the time of splicing; to provide means for moving a switch, for controlling the motion of the reel, toward and away from the brush in accordance with the size of the spare roll; to provide means for automatically allowing the proper amount of time for the splice to be made before the severing knife circuit is connected up; to provide means whereby voltage is placed on the magnetic clutch gradually so that the fresh roll, operated by said clutch, will be given a smooth acceleration and also the effectiveness of the magnetic clutch will be gradually decreased in such a manner that, as the freshly pasted roll begins to bear against the tension straps, the effectiveness of the magnetic clutch decreases while the effectiveness of the tension straps increases; to so connect the magnetic clutch that when the press comes to a stop full voltage is thrown on the magnetic clutch to assist in retarding a large roll in the case of an emergency stop; to provide means whereby, although the magnetic clutch is energized, it will be mechanically disconnected so as to impart no retarding motion to a small roll when the press is being stopped, leaving a small roll under the influence of the ordinary tension straps alone; to provide a construction by which the running roll can be moved to give it more or less of an arc of contact with the tension straps so that the tension on the web may be varied as desired; to provide simple means whereby the shaft carrying the spare roll may be moved laterally to correct its side register; to provide an improved and simplified means by which the spare roll is driven from the press through the axis of the spare roll; to provide a selective device for permitting connection between the variable speed mechanism and the shaft on which the roll is carried and disconnection as desired; to provide a commutator rotating in definite relation to the rotation of the spare roll so that the commutator may be used for timing the application of the web to the spare roll to secure proper splicing; to provide automatic means for preventing rotation of the reel while the brush arm is in operative position, thereby avoiding the endangering of the mechanism.

Other objects and advantages of the invention will appear hereinafter.

Reference is to be had to the accompanying drawings, in which

Fig. 1 is a side view, partially diagrammatic, showing four decks of a printing press, with this invention applied to each deck;

Fig. 2 is a similar view of three of the splicing devices, showing additional details;

Fig. 3 is a similar view showing the lowest one of the four decks;

Fig. 4 is an end view of the machine looking from the left in Fig. 5ª and showing one deck;

Figure 11:
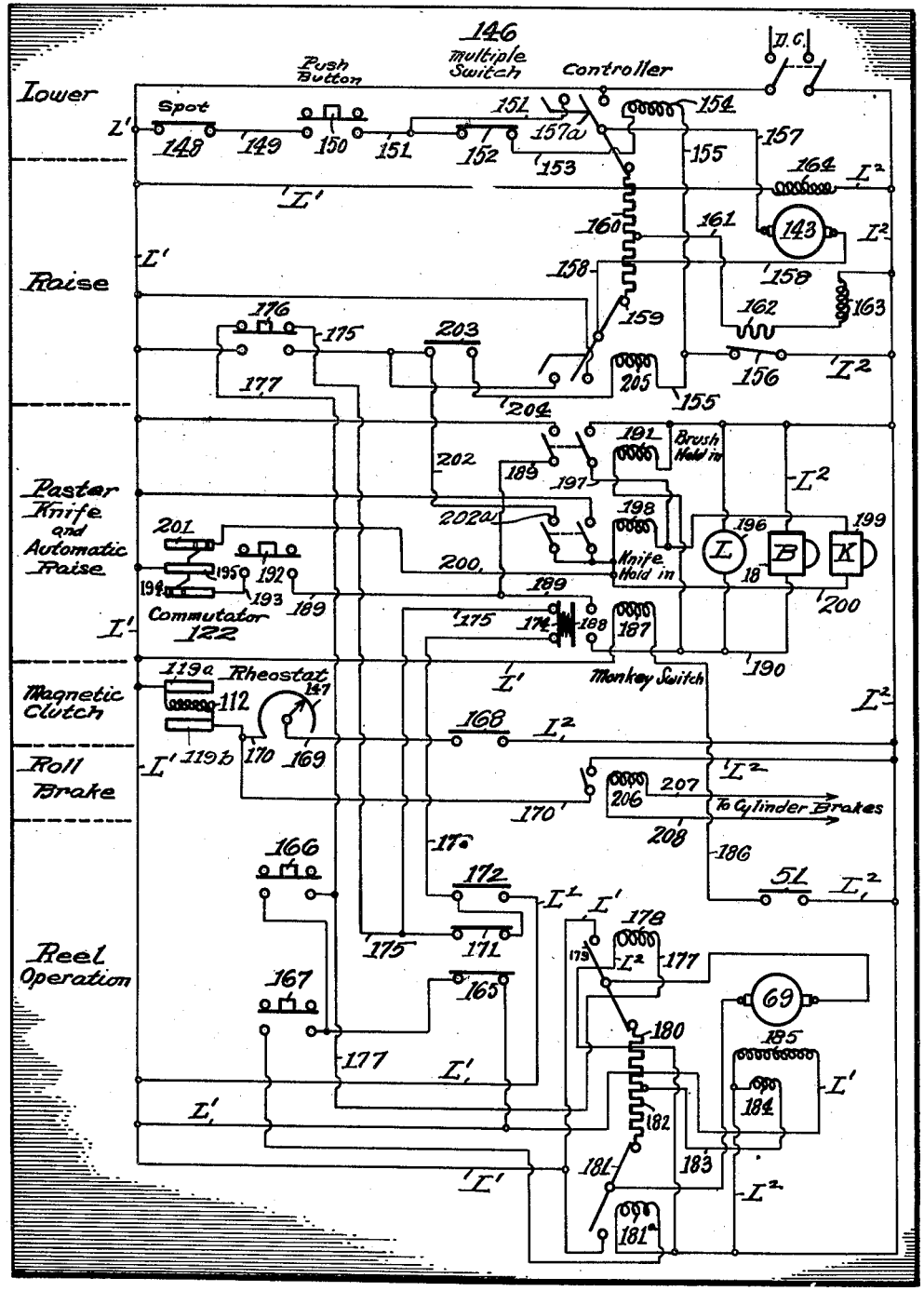

Figs. 5 and 5ª are longitudinal diagrammatical sectional views of the opposite ends of the roll supporting reels and parts associated therewith;

Fig. 6 is an enlarged view, partially in section, showing the means for operating the monkey switch;

Fig. 7 is a fragmentary view in section of the monkey switch operating device;

Fig. 8 is a fragmentary sectional view of the means for supporting the left-hand end of a web roll;

Fig. 9 is a sectional view on the line 9—9 of Fig. 5;

Fig. 10 is a side view of the mechanism shown at the top of Fig. 2, and

Fig. 11 is a wiring diagram.

This invention involves improvements in my applications for patent, Serial No. 595,059, now Patent No. 2,086,144, Serial No. 686,225, and Serial No. 700,966, now Patent No. 2,060,360.

One feature which is related to the latter case is the moving of the fresh web roll in an oblong path with the major axis horizontal for the purpose of reducing the amount of space taken up by it. This differs therefrom essentially in the fact that in that case the roll moves in an elliptical path with the major axis vertical.

The device is shown as supported by a frame 67 in which are mounted stationary side frames 65 and 66 on which the central shafts 60 and 97 are supported. These shafts carry end discs 61 and 62, which constitute the reel or support for spindles 96 which carry the rolls, the fresh roll S and a running roll R. The reel carries, parallel with the shaft 60, two shafts 134. The roll spindles 96 are mounted to rotate about the shafts 134 and geared to make two such rotations for each rotation of the shaft 60. Each roll spindle, therefore, moves from a position outside the circle described by the shaft 134 to a position inside it and travels in an elliptical path with its major axis horizontal.

As stated, this invention is particularly applicable to the multiple deck type of press, with the decks one above another and is shown in Figs. 1, 2 and 3 as having four decks A, B, C and D, each one having a separate splicing mechanism one above another. Each deck, of course, comprises the customary impression cylinders 5, plate cylinders 6 and ink motions 7, parts of which are shown.

Referring to Fig. 1, the several splicing mechanisms are shown in four different positions. The one for deck A has its running roll R of substantial size and in its normal position for feeding the web W to that deck of the press. Tension straps 8 pass under this roll R over a shaft 9 and carry weights 10 for applying the desired amount of tension. The other end of each tension strap 8 is secured to a horizontal rod 11.

By bearing against the running roll R these tension straps, several of them arranged to engage each roll, serve to control the tension on the web. By moving the roll support or reel so that the roll R is given more or less arc of contact with the straps 8, the tension on the web W may be varied, as desired.

It will be understood that all these structural features are repeated on each deck of the press. The reel or roll support is adapted for supporting two web rolls, in the particular form shown, but the application is not limited to that type of reel. The spare roll S is loaded from a pair of arms 24 to the reel and is held in readiness to replenish the supply when the running oil is exhausted.

The second step is shown in deck B where the running roll R is almost exhausted and has been moved down toward the rod 11 while the spare roll has been moved off the arms 24 and describes a substantially semi-elliptical path in moving from its initial position to running position. It is at its highest point in deck B, where it is close to the web and ready for splicing.

The next step is shown in deck C where the splice is accomplished and the web from the roll R has just been severed. In deck D the spare roll S, now feeding the web, is moved further along so that it is in full contact with the tension straps and the roll R, which has been severed, has been moved away so that the stub can be removed with its spindle.

Of course, each of these decks is provided with a splicing arm or frame 12 mounted on the shaft 9 and adapted to be swung for splicing, by any known means, such as a motor 143. These motions are indicated in order by the positions shown at decks A, B, C and D. The arm 12 is provided with a suitable form of splicing device shown as a brush or brushes 13 which, in deck C, bear against the running web. The brush arm constitutes the element which performs the splicing and on it is pivotally mounted a shaft 14 which is secured to a bracket 15 for mounting the brushes 13. Also secured to the shaft 14 is an arm 16 which is held in position by a spring 17. A solenoid 18 is mounted on the brush arm and may be used to rotate the arm 16 in a counterclockwise direction, as indicated at deck C to force the web against the spare roll S and there perform the splicing operation.

A severing knife 19 is pivotally mounted on each brush arm or frame 12 to sever the web after the splice has been completed and operates as usual. As shown in deck D, Fig. 3, the brush arm is moved to inoperative position relative to the spare roll S. The roll S has become the running roll and is moved against the tension straps 8 to control the tension of the web supply to the press. Broadly speaking this is the complete cycle of operations to splice the web. Below will be described a variable speed mechanism set to give the proper surface speed to the spare roll S and to vary that speed in accordance with the diameter of that roll.

A drum 20 is shown as mounted on a shaft 21 and driven by any suitable means, not shown, to operate cables 22 which pass over rolls 23 to lift the spare rolls S and place them as needed on the arms 24, two of which are supplied for each splicing mechanism.

At deck A, the spare roll S is just starting to move in an elliptical path in a counterclockwise direction. When the roll S comes into contact with a roller 25 mounted on an arm 26 secured to a shaft 27, rotatably mounted on a brace 28, it lifts the arm 26 and turns the shaft 27. Also secured to the shaft 27 is a ratchet segment 29 which may be engaged by a spring-pressed pawl 30, pivoted on a bracket 31 secured to the end frame 66 of the machine. A spring 33 bearing against the bracket 31 and the pawl 30 tends to keep the pawl 30 held yieldingly against the teeth of the ratchet 29.

As the spare roll S continues in the first quadrant of its motion in the direction stated, a gear cover 61a carried by the spider 61 engages a projection 34 on the pawl 30. This moves the pawl back from the teeth and releases the ratchet segment 29. This action permits the arm 26 to drop until the roller 25 rests on the surface of the advancing spare roll S. Its elevation, or extreme position, is determined by the diameter of the spare roll. As the spare roll moves further in the same direction the roll 25 is lifted and when it gets to its extreme position it measures the diameter of the spare roll. At that time the pawl 30 retains or sets the roll 25 at this elevation until after the splice has been completed. The gear cover 61a operates to release it on the next rotation.

The setting of the roll 25 in its extreme position has two purposes. It regulates a variable speed mechanism to rotate the spare roll just fast enough to give it the proper surface speed, that is, the linear speed of the web, at the time of splicing. Also the setting of the arm 26 in the above mentioned position regulates a stop switch, as will be explained later. In this way variations in roll diameter are compensated for to make the roll support or reel stop at the proper location to leave a predetermined distance between the roll and the splicing brush over which the web is traveling just previous to the splicing.

The spare roll S is mounted on the spindle 96 having bearings 95 in the arm 35 at one end and bearings 101 in an arm 98 at the other. These arms project radially from shafts 92 and 134a carried by the spiders 61 and 62. Gearing is provided for rotating the arms 35 and 98 on the shafts 92 and 134a twice during each revolution of the reel.

Secured to the shaft 27 is an arm 36 whose free end is pivotally connected to a spring rod 37. The spring rod carries collars 38 and 39 and springs 40 and 41 which abut against them respectively. Between the springs it also carries a trunnion 42 slidably mounted upon it. Pivotally connected to the trunnion 42 is a bell crank 43 the other arm of which is pivotally connected to a link 44. The lower end of the link 44 is pivoted to the free end of an arm 45 secured to a shaft 46 of a variable speed mechanism 47, the details of which are not illustrated herein. As usual, this mechanism is able to vary the speed with which a shaft 108, driven by the press and, of course, in proportion to the speed of the press, rotates the spare roll. The gearing between the variable speed mechanism 47 and the spare roll will be described below.

Secured to the shaft 27 is an arm 48 the free end of which is pivotally connected by a link 49 to a switch support lever 50. This lever is oscillatably mounted on the shaft 60 of the reel. A monkey switch 51 is mounted on the lever 50. The angular motion of the shaft 27 will move the switch 51 toward or away from the brush 13 and its motion is controlled by the size of the spare roll S. The switch supporting lever 50 carries two projections 52 which carry a slide rod 53 on which are carried a collar 55 and spring 54. The spring 54 tends to keep the rod 53 in its lowermost position, as viewed in Fig. 6, until such time as a projection 56 on a disc 57 bears against the rod 53 to operate the switch roller of the switch 51. The disc 57 is secured to a plate 58 carried on the shaft 60 by an angular clamping ring 59. Therefore, the disc 57 rotates with the spiders 61 and 62 of the reel.

The position of the monkey switch 51 is controlled by the diameter of the spare roll S through the roll 25, shaft 27 and arm 48. Therefore the projection 56 may be used to operate the switch 51 and thereby stop the roll support or reel in the proper position for splicing the spare roll S to the running web W. The switch 51 is connected with a motor 69 for rotating the reel. A guard 64 is provided for the disc 57 and in it is an opening 63 through which the rod 53 passes giving sufficient latitude to permit the rod to move the extent of the regulation. Of course, a similar speed setting and roll locating device is used on each of the splicing mechanisms.

Figs. 5 and 5a show the roll supports or reels mounted in stationary end frames 65 and 66, the left hand ends of which are shown in Fig. 4, connected to the press frame 67. These devices are built up in units and placed one upon the other so that they may be secured to each other in vertical alignment by bolts 68.

The reel motor 69 is secured to the end frame 66 and coupled to a shaft 70 by a coupling 71. On the shaft 70 is fixed a pinion 72 which meshes with a gear 73. The gear 73 and a worm 74 are mounted on a shaft 75. The worm 74 meshes with a worm wheel 76 which is secured to a shaft 77 mounted by bushings in the end frames 66 and 65 with outboard bearings and covers 78 and 79 which protect the gears on the frames 65 and 66.

On the shaft 77 are fixed the gears 80 and 81 which mesh respectively with large gears 82 and 83. The gear 82 is secured to the shaft 60 to drive it by a key 84 and collar 85. The mounting of the shaft 60 on the end frame 66 is by a bushing 86. The shaft 60 carries to its left hand end the roll support or spider 61 which, of course, rotates therewith. The gear 83 is fixed on a stud 97 which carries the left hand spider 62.

A stud 87 is mounted in the spider arm 61 and carries independently rotatable intermediate gears 88 and 89. The intermediate gear 88 meshes on the one side with a stationary gear 90 secured to the end frame 61 and on the other side with a gear 91 which, by means of a sleeve 92, is rotatably mounted in bearings 93 carried on the spider 61. As the reel rotates, the gears 89 and 91 are rotated.

The left hand end of the sleeve 92 has secured to it the arm 35 which has been referred to. A straight hole 94 in the free end of the arm 35 serves as a mounting for ball bearings 95 carried on one end of the spare roll spindle 96. In the present embodiment the gear ratios are such that at one rotation of the spider 61 the arm 35 makes two revolutions about the axis of the sleeve 92.

The gear 83 being secured to a support shaft 97, and a similar train of gearing being used, the arm 98 will describe a path exactly like that of the arm 35 and in unison therewith. A hole 99 in the arm 98 is provided with a groove 100 for cooperating with ball bearings 101 secured to the end of the spindle 96. This groove is used to control the end motion of that spindle and therefore the side register of the spare roll S. These supports for the bearings 95 and 101 are capped to permit the loading of the spindle 96 therein. Cones 102 serve to lock the spare roll S on the spindle 96.

Clearance is provided between the gear 83 and the end frame 65. Thus the shaft 97 can be moved laterally to correct the side register of the spare roll S. This is accomplished by rotating a hand wheel 103 located on the shaft 97. Secured to the cover 79 is a sleeve 104 provided with four projections 104a which fit in four recesses provided in a threaded nut 105 on the shaft 97 to prevent rotation of the nut. The nut 105 is loosely mounted on the shaft 97 and secured against longitudinal motion by a shoulder on the shaft and a lock nut 105a, which is screwed up on the shaft 97. A washer 106 is secured to the projections 104 and thereby confines the regulating wheel 103 longitudinally. The wheel 103 carries an internal thread which cooperates with a threaded portion of the nut 105 between the projections. Thus the rotation of the regulating wheel 103 can be used to shift the shaft 97 longitudinally and thereby provide a convenient way of adjusting the side register of the roll S and roll R. A cover 107 like the cover 61a is provided for the gear train serving the spider 62 on that end.

The spare roll is provided with a drive from the vertical shaft 108 driven from the press. This shaft 108 carries a bevel gear 109 secured thereto. This bevel gear meshes with a bevel gear 110 carried on one shaft of the variable speed mechanism 47. The power delivery shaft 111 of this variable speed mechanism is secured to a shaft 113 which has a magnetic clutch 112 thereon. A gear 114 is rotatably mounted by bearings 115 on the shaft 113 and is secured to a shiftable disc 116 which serves as the relatively movable part of the magnetic clutch 112. On the end frame 66 is mounted a bearing 117 having a seal 118 which helps to support the shaft 113. On the left hand end of the shaft 113 is mounted a selector ring drum 119, the selector rings of which may be used to serve the magnetic clutch 112. A cover 120 is provided for these selector rings.

The gear 114 meshes with the gear 121 which with a commutator 122 is secured to a shaft 123 parallel with the shaft 113. This commutator carries a central conducting ring 195 and two offset segmental rings 194 and 201. The shaft 123 is mounted by bearings 124 and 125 in the end frame 66 and cover 78. The commutator 122 is also provided with a cover 122ª. The gear 121 also meshes with the gear 126 which, with a pinion 127, is fixed to a shaft 128 rotatably mounted in bearings 129 in the end frame 66. The pinion 127 meshes with a duplex internal gear segment 130—131 which is rotatably mounted by a bushing 132 on the end frame 66. The gear 131 of the duplex gear meshes with the intermediate gear 89 which in turn meshes with a gear 133 slidably splined to the shaft 134 which also carries fixed thereto a gear 135. The shaft 134 is rotatably mounted in the sleeve 92 and provided with a limited endwise motion. This motion is controlled by a fork 136 having radial studs operating in a groove 137 on the shaft 134. This permits the gear 135 to be moved to the left, as shown in the lower part of Fig. 5ª, to disengage the connection of a gear 138 from the gear 135. The gear 138 is secured to the spindle 96 of the roll R or S. Thus, a selective device is provided which permits connection between the variable speed mechanism 47 and the spindle 96 and disconnection as desired.

Just prior to splicing, the gear 138 will mesh with the gear 135 and the variable speed mechanism 47, driven by the press, will rotate the magnetic clutch 112. Since this magnetic clutch is not energized the spare roll S will remain stationary until such time as the magnetic clutch is energized. This energization causes the clutch to cooperate with the disc 116 to start the spare roll S to rotate through the train of gearing just described. After the splice has been made the fork 136 may be used to move the gear 135 to the left, disconnecting it from the gear 138, as shown at the bottom in Fig. 5ª, with respect to the running roll R. Any convenient means may be used for this purpose such as a cam 139 secured to the end frame 66 and operating against a roller 140 carried by the fork 136. In the present embodiment the commutator 122 is geared to rotate one complete revolution while the spare roll S rotates one complete revolution. This commutator may be used, therefore, for timing the application of the running roll to the fresh roll and web to secure proper splicing.

Upon the shaft 9 is fixed a worm wheel segment 141, illustrated in deck D, Fig. 3. The segment 141 meshes with a worm 142 carried on the shaft of the motor 143. By the operation of the motor 143 first in one direction and then in the other, the brush arm 12, which is fixed with respect to the segment 141, oscillates with the shaft 9. It is moved back and forth to the operative and inoperative positions. Carried on the shaft of the motor 143 is a pinion 144 meshing with a gear 145 carried on the shaft of a multiple switch 146 which has contacts 152, 203, 168, 172, 171 and 165. The other end of this shaft carries and operates a rheostat 147 which is connected with the circuit of the magnetic clutch 112, as shown in the wiring diagram. This rheostat is used to energize and deenergize this magnetic clutch gradually while the multiple switch 146 through its contacts properly operates the different functions of the splicing mechanism.

Operation

In the description of the operation the wiring diagram will also be described. The spare roll S is properly prepared for splicing in any usual way, as by cutting the leading edge of the web to a point, securing it with a frangible sticker to the spare roll, and coating this leading edge with paste. When this is done the spider arms 61 and 62 are brought, by operation of the motor 69, approximately to the position shown in deck B of Fig. 2, at which time a contact 148 is made on the disc 57 connecting the main line L' with a line 149. By depressing a button 150, this line 149 is connected with a line 151. Since a contact 152 is closed in the multiple switch connecting the line 151 with a line 153, a circuit is completed through to the contactor coil 154. The other side of the coil 154 is connected with a line 155, which, through a thermal relay 156, is connected to the main line L². The energizing of the contactor coil 154 closes contacts 157ª connecting the line L' through the line 151 with the line 157. The contacts 157ª and 152 constitute a hold-in circuit for the coil 154. The line 157 is connected to one side of the armature of the motor 143. The other side of the armature is connected by a line 158 through contacts 159 to an adjustable resistance 160 and wire 161 to a heating coil 162, which constitutes a part of the thermal relay 156, through a series field 163 to line L². This completes the circuit to the motor 143 and, since the shunt field 164 is directly connected to the main lines L' and L², this motor 143 operates the brush arm from the position shown at deck A in Fig. 2 to that shown in deck B. The motor 143 continues to operate until the contacts 152 in the multiple switch 146 are opened, which action deenergizes the coil 154, opening the contacts closed thereby and stopping the motor 143.

During this cycle of operations certain contacts will open and close with the multiple switch 146 in a predetermined manner. Thus contacts 165 are opened shortly after the motor 143 starts to lower the brush arm 12. This, as will be seen from the diagram, prevents rotation of the reel motor 69 by the operation of a forward button 166 or reverse button 167. This, of course, prevents rotation of the reel while the brush arm 12 is in operative position, thereby avoiding the endangering of this mechanism. When the forward button 166 is depressed to connect the line 177 to the main line L' through the switch 165, the motor 69 will rotate forwardly. The reverse button 167 connects 177 to L' through 165 on one side and completes the reverse circuit through 181ª to L².

As the brush arm continues on its way down contacts 168 are closed. This connects the line L² to a line 169 which runs to the movable contact of the rheostat 147. The stationary side of the rheostat 147 is connected to a line 170 which is connected to one side of the magnetic clutch 112. The other side of the clutch 112 is connected with the line L'. Contacts are made from the clutch 112 to line L² through the rings of the drum 119.

The energizing of the clutch 112, as described above, causes the rotation of the spare web roll to be accelerated until the surface of the roll rotates at web speed, before the brush arm reaches the lowermost position. The contacts 171 are opened immediately thereafter while the contacts 172 are closed to connect the line L' to the line 173 which runs to a normally closed contact 174 where it connects with the line 175, which line is connected with the contacts 171 and also with a pair of normally closed upper contacts of the push button 176. The other side of the line to these contacts is designated 177. This wire runs to one of the lower contacts in the forward push button 166 and also one side of the coil 178. The other side of the coil 178 is connected directly to the main line L². The energizing of the coil 178 closes contacts 179 to the line L², opens contacts 179 with an adjustable resistance 180. The contact 179 is connected to one side of the armature of the motor 69 which operates the reel. The depression and opening of the contact 176 cuts out the motor 69. The other side of this motor is connected to a movable contact 181 at its center. This contact 181 is connected with the resistance 182 and operated by a coil 181ᵃ. The contact for this resistance 182 is connected through a wire 183 to a series field coil 184 of the motor 69, the other side of which resistance is connected to the line L². The field 185 of the motor is connected on one side directly with the line L² and the other with line L'. Thus the motor 69 will rotate to operate the reel and carries the spare roll closer to the running web. When the spare roll S has reached the position shown in deck B the switch 51 is closed, as described above. The closing of this switch connects the line L² with the wire 186 which runs to one side of the monkey switch of the coil 187, the other side of which is connected with the line L'. The coil 187 will be energized when the switch 51 is closed. The energizing of this contactor causes contacts 174 to open, and through the circuit just traced, opens the connections to the armature of the reel motor 69 and thereby stops the rotation of the reel. The energizing of the coil 187 also closes contact 188 which connect wires 189 and 190. The wire 189 is connected with the movable contacts served by a coil 191 and also with a paste push button 192. The coil 191 will be deenergized by the opening of the contacts 188 as shown in Fig. 11.

The spare roll S is now revolving so that its surface speed is equivalent to that of the web W and the operator is watching the running roll R until it is almost exhausted, at which time he presses the paste button 192 which connects the line 189 with the line 193. The line 193 runs to a contact brush operating against one of the rings carried on the commutator drum 122. A segment 194 which is electrically connected to a ring 195, which in turn is served by a brush connected with line L', gives an intermittent circuit from L' through to the segment 194. In this manner a timing arrangement is provided for the proper operation of the brush solenoid 18. This connection to the segment 194 occurs when the paste button 192 is depressed so that the circuit from L' courses through the ring 195, segment 194 and line 193, to the line 189 and through contacts 188 to the line 190. The line 190 is connected to the brush solenoid 18, the other side of which is connected to the line L². This same line of connections also energizes a signal light 196 and the brush hold-in coil 191.

As described above, the operation of the brush solenoid 18 causes the brush 13 to press the web W against the spare roll S to make the splice. Since the contact of the segment 194 is momentary, a hold-in circuit is provided through the line 189 which, when the brush hold-in coil 191 is energized, closes to the line L' to hold in the coil 191, brush solenoid 18 and light 196, all of which are connected in parallel. The energizing of the coil 191 also connects L² and 197, the latter of which is connected to one side of a knife hold-in coil 198 and knife solenoid 199, the other sides of which are connected with a line 200. The line 200 may be traced to the movable interlocks of a pair of knife hold-in contacts 202ᵃ served by the coil 198 and also to the third ring of the commutator drum 122 on which is mounted a segment 201 electrically connected with the ring 195. The angular relation between the segments 194 and 201 is such that the proper amount of time is permitted for the splice to be made through the segment 194 by the operation of the brush 13 before the segment 201 can complete a circuit through the knife solenoid 199 to operate the knife 19 for severing the web as shown in deck C of Fig. 2. Since the circuit provided through the segment 201 is momentary, an interlock on the knife hold-in contactor connects the line 200 with L' and thereby holds in the knife hold-in coil 198 and knife solenoid 199. The coil 198 will be deenergized regularly by the commutator.

A second interlock on the same contactor connects the line 200 with the line 202 which may be traced through contacts 202ᵃ to one side of a pair of contacts 203 in the multiple switch and also to one of the lower contacts of the raise push button 176. Since contacts 203 are closed, a circuit may be traced from L' through the contacts 202ᵃ to a line 204 which is connected with one side of a raise contactor coil 205. The other side of the coil 205 is connected to a line 155 and through a thermal relay 156 to the line L². The energizing of the coil 205 causes the line 158 to be connected with L'. The line 158 is connected with one side of the lift motor 143 and the other side may be traced through the line 157, resistance 160, line 161, heating coil 162, and series field 163 to the line L². The motor 143 is then operated in such a direction as to move the brush arm 12 from the position shown in deck C to that shown in deck D of Fig. 3. When these aforesaid contacts are closed, a hold-in circuit is established by another interlock on the contactor 205 which closes with the line 202. This serves to hold in the contactor coil 205 until such time as the upper limit contacts 203 are opened, leaving the brush arm 12 in the inoperative position.

As the arm 12 is raised and the contacts 172 remain closed, when the contacts 171 are closed, a circuit is established from L' through the contacts 172 to the line 173 through the contacts 171 to a line 175 through the upper contacts of the push button 176 to the line 177. This connects L' with one side of the coil 178 and, in a manner previously described, causes the reel motor 69 to operate, carrying the fresh roll, which has now become the running roll, to the position shown at deck D of Fig. 3 so that it bears against the straps 8.

The rotation of the motor 69 continues until such time as the contacts 172 are opened just prior to the opening of the contacts 203, the former to stop the reel motor 69 and the latter to stop the lift motor 143. It will be noted that the rheostat 147 is provided in the magnetic clutch circuit which drives the fresh roll. One function of this rheostat is to place voltage on the magnetic clutch 112 gradually so that the fresh roll may be given a smooth acceleration. Since the rheostat 147 is geared to the mechanism which lifts and lowers the brush arm 12, as shown in Fig. 3, it is used after a splice is made to gradually decrease the effectiveness of the magnetic clutch 112. As the freshly pasted roll begins to bear against straps 8 and derive its control therefrom the effectiveness of the magnetic clutch 112 is decreased as the effectiveness of straps 8 increases. While the running roll is large it is run in the position shown in decks A and D at which time the gear 138 still meshes with the gear 135.

It is customary for presses to be equipped with cylinder brakes. When, with the parts so located, an emergency stop is made on the press it will be noted that the coil 206 is connected by wires 207 and 208 in parallel with the cylinder brakes so that any energizing of the cylinder brakes also energizes the coil 206 to close contacts between L² and the line 170. This causes full voltage to be thrown on the magnetic clutch 112 and thereby assists in retarding a large roll on an emergency stop. When the press comes to rest and the cylinder brakes are deenergized the coil 206 drops out the contacts between L² and 170, thereby releasing the power on the magnetic clutch 112. When the mechanism is in the position shown in Figs. 5 and 5ᵃ it will be seen by Fig. 5ᵃ that the gears 138 and 135 of the running roll spindle are disconnected through the operation of the cam roller 140 on the cam 139. Even though the coil 206 is energized and closes the contacts between L² and 170 to energize the magnetic clutch 112, no retarding motion is imparted to the small roll. The pressure of straps 8 is sufficient to control the smaller sized rolls.

It will be seen that although this invention is applicable to other types of presses, the reduction in the vertical space taken by the splicing device makes it particularly adaptable for a multiple deck press in which the several splicing mechanisms are arranged vertically. The same principle can be applied where they are arranged in alignment extending in some other direction. The relative arrangement of the running roll with respect to the tension straps is an important feature, especially in view of the shape of the orbit in which the roll travels.

By this arrangement the roll, in accordance with its size, controls the stopping of the reel, the regulation of the variable speed mechanism for rotating the reel, the provision of a predetermined distance between the spare roll and the splicing brush at the time of splicing, and the control of the movement of the splicing brush.

The invention also provides for applying heavy voltage on the magnetic clutch gradually to give smooth acceleration and also smooth deceleration. An arrangement is provided by which, when the press comes to a full stop, full voltage is thrown on the magnetic clutch to assist in retarding the roll, if it is a large roll, but, if it is a small roll, the action of the magnetic clutch on the rotation of the roll can be very simply and mechanically avoided without deenergizing the magnetic clutch.

The rotation of the commutator in definite relation to that of the spare roll enables the commutator to be used in timing the application of the web to the spare roll to secure proper splicing. Furthermore, a safety feature is introduced by the provision of the automatic means for preventing the rotation of the reel while the brush arm is in operative position.

Having thus described my invention and the advantages thereof, I do not wish to be limited to the details herein disclosed, otherwise than as set forth in the claims, but what I claim is:

1. The combination with a roll supporting reel for a web splicing device having means for moving the fresh roll in an elliptical path with its major axis substantially horizontal, of a frame carrying means for pressing the running web against the fresh web roll, a member adapted to rest on the top of the fresh web roll as it moves in said path, means for holding the said member at its maximum height after the web roll has passed it, and a switch automatically movable toward and away from the web, controlled by said member in accordance with the diameter of the web roll.

2. The combination with two spiders and central studs supporting them to constitute a web roll carrying reel, of an arm on a spider for carrying the spindle of a web roll, a shaft carried by the spider, a gear on the web roll spindle, a gear on said shaft normally meshing with said gear, means for rotating said shaft on its own axis as the reel rotates, and means for moving the gear on the shaft longitudinally out of mesh with the other gear and keeping it out of mesh during a part of the rotation of the reel.

3. In a web roll carrying reel, the combination with two spiders and central shafts for rotatably supporting them, of a stationary cam, cam rolls cooperating with the cam, levers carried by the spider and supporting the cam rolls, longitudinally shiftable shafts carried by the spider, means for shifting said shafts by the action of said cam on the cam rolls, a gear on each shiftable shaft, web roll spindles, and a gear on each web roll spindle normally meshing with said gears, but disconnected from them when the respective levers are moved by the cam.

4. In a web roll support, the combination of a pair of spiders, means for rotating said spiders on a central axis, each spider having on each arm a shaft parallel with the central axis, arms on said shafts, means for rotating said arms about the said shafts, a spindle supported by said arms for carrying a fresh web roll, a gear on the spindle, a wider gear for moving the first named gear and spindle, a reciprocable shaft on which the wider gear is mounted, said reciprocable shaft being carried by the spider, means for controlling end motion of the spare roll for side registry, and means for moving one of the end spiders longitudinally to change the side register.

5. In a side register device for a web roll support, the combination of a longitudinally movable shaft, a spider supported thereby for carrying the end of a web roll, a frame in which a stud is mounted to turn, a cover around part of the frame, a sleeve secured to said cover and carrying radial projections, a nut provided with recesses fitting in said projections, said nut being loosely mounted on said stud, and a hand wheel engaging said projections to be rotated by the hand wheel, whereby the rotation of the hand wheel will shift the stud to adjust the side register of the running roll carried by the spider.

HENRY A. WISE WOOD.